United States Patent
Marupaduga et al.

(10) Patent No.: US 9,019,820 B1
(45) Date of Patent: Apr. 28, 2015

(54) OPTIMIZING VOICE SERVICES

(71) Applicant: Sprint Communications Company L.P., Overland Park, KS (US)

(72) Inventors: Sreekar Marupaduga, Overland Park, KS (US); Nicholas David Caola Kullman, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 117 days.

(21) Appl. No.: 13/928,993

(22) Filed: Jun. 27, 2013

(51) Int. Cl.
*H04L 1/00* (2006.01)
*G06F 11/00* (2006.01)
*H04W 4/00* (2009.01)
*H04J 3/16* (2006.01)
*H04W 24/02* (2009.01)

(52) U.S. Cl.
CPC ..................................... *H04W 24/02* (2013.01)

(58) Field of Classification Search
CPC . H04W 28/04; H04W 52/244; H04W 72/082; H04L 1/00; H04L 1/0009; H04L 1/0014; H04L 1/0026; H04L 1/0072; H04L 1/1864; H04L 5/0073; H04B 7/0632; H04B 1/0475; H04J 11/005

USPC ................ 370/229–238, 252–253, 310–350, 370/431–439, 464–473

See application file for complete search history.

(56) References Cited

U.S. PATENT DOCUMENTS

| | | | | |
|---|---|---|---|---|
| 8,699,621 | B2 * | 4/2014 | Yue et al. | 375/299 |
| 2007/0300120 | A1 * | 12/2007 | Kim et al. | 714/749 |
| 2008/0096563 | A1 * | 4/2008 | Fischer et al. | 455/436 |
| 2009/0203384 | A1 * | 8/2009 | Vujcic | 455/450 |
| 2009/0219851 | A1 * | 9/2009 | Abraham et al. | 370/315 |
| 2010/0185911 | A1 * | 7/2010 | Cheng | 714/751 |

OTHER PUBLICATIONS

Anna Larmo et al., "LTE Part II: 3GPP Release 8—The LTE Link-Layer Design", Apr. 2009, IEEE Communications Magazine, 0163-6804/09 IEEE, pp. 52-59.*

* cited by examiner

*Primary Examiner* — Tri H Phan (57) ABSTRACT

Systems, methods, and computer-readable media for optimizing voice services are provided. Hybrid automatic repeat request (HARQ) is an algorithm that implements fast retransmissions of lost blocks or packets of data. HARQ is an error correcting algorithm. Data may be lost at any layer of a protocol stack, thus, increasing a retransmission rate. In order to reduce the retransmission rate and increase quality of voice services, HARQ may be implemented at each layer of a protocol stack based on, for example, radio frequency signal and retransmission rates.

20 Claims, 5 Drawing Sheets

OPTIMIZING VOICE SERVICES

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, optimizing voice services. Utilizing embodiments hereof, voice service in, for example, a 4G (LTE) network, may be improved by implementing a Hybrid Automatic Repeat Request (HARQ) algorithm at each layer of a protocol stack of the network. In particular, quality of a Voice Over LTE (VoLTE) call may be improved by implementing HARQ at each layer of a protocol stack of a network.

BRIEF DESCRIPTION OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention may be embodied as, among other things, a method, a system, or set of instructions embodied on one or more computer-readable media. As mentioned, embodiments of the present invention are directed toward optimizing voice services. Utilizing embodiments hereof, voice service in, for example, a 4G (LTE) network, may be improved by implementing a Hybrid Automatic Repeat Request (HARQ) algorithm at each layer of a protocol stack of the network. In particular, quality of a Voice Over LTE (VoLTE) call may be improved by implementing HARQ at each layer of a protocol stack of a network.

Accordingly, in one aspect, the present invention is directed to one or more computer-readable storage media having computer-executable instructions embodied thereon that, when executed, perform a method for optimizing voice services. The method includes identifying a user device within an area associated with a poor signal and implementing a HARQ algorithm at each layer of a protocol stack of a network.

In another aspect, embodiments of the present invention are directed to one or more computer-readable storage media having computer-executable instructions embodied thereon that, when executed, perform a method for optimizing voice services. The method includes identifying a first poor RF signal condition for a first area associated with a user device, identifying a high retransmission rate, based on the first poor RF signal condition and the high retransmission rate, implementing a HARQ algorithm at each layer of a protocol stack in a network, identifying a second RF signal condition for the first area, updating the first poor RF signal condition with the second RF signal condition, wherein the second RF signal condition is a strong RF signal than the first poor RF signal condition, and upon identifying the second RF signal condition is stronger than the first poor RF signal condition, removing the HARQ algorithm from one or more layers of the protocol stack.

In yet another aspect, a system for optimizing voice services. The system includes a computing device associated with one or more processors and one or more computer storage media and an optimization engine. The optimization engine comprises an identifying component for identifying at least one of a type of network, a retransmission rate of a user device and a radio frequency (RF) signal of an area associated with the user device, a determining component for determining at least one of whether the user device is operating a voice functionality and whether the retransmission rate exceeds a predetermined threshold, and an implementing component for implementing a HARQ algorithm at each level of a protocol stack.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third Generation Mobile Telecommunications
4G Fourth Generation Mobile Telecommunications
CD-ROM Compact Disk Read Only Memory
CDMA Code Division Multiple Access
GPRS General Packet Radio Service
GSM Global System for Mobile communications: originally from Groupe Special Mobile
DVD Digital Versatile Discs
EEPROM Electrically Erasable Programmable Read Only Memory
HARQ Hybrid Automatic Repeat Request
HLR Home Location Register
HSDPA High-Speed Downlink Packet Access
LTE Long Term Evolution
PC Personal Computer
PDA Personal Digital Assistant
RAM Random Access Memory
ROM Read Only Memory TDMA Time Division Multiple Access
UMTS Universal Mobile Telecommunications System
VOIP Voice Over Internet Protocol
VoLTE Voice Over LTE
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
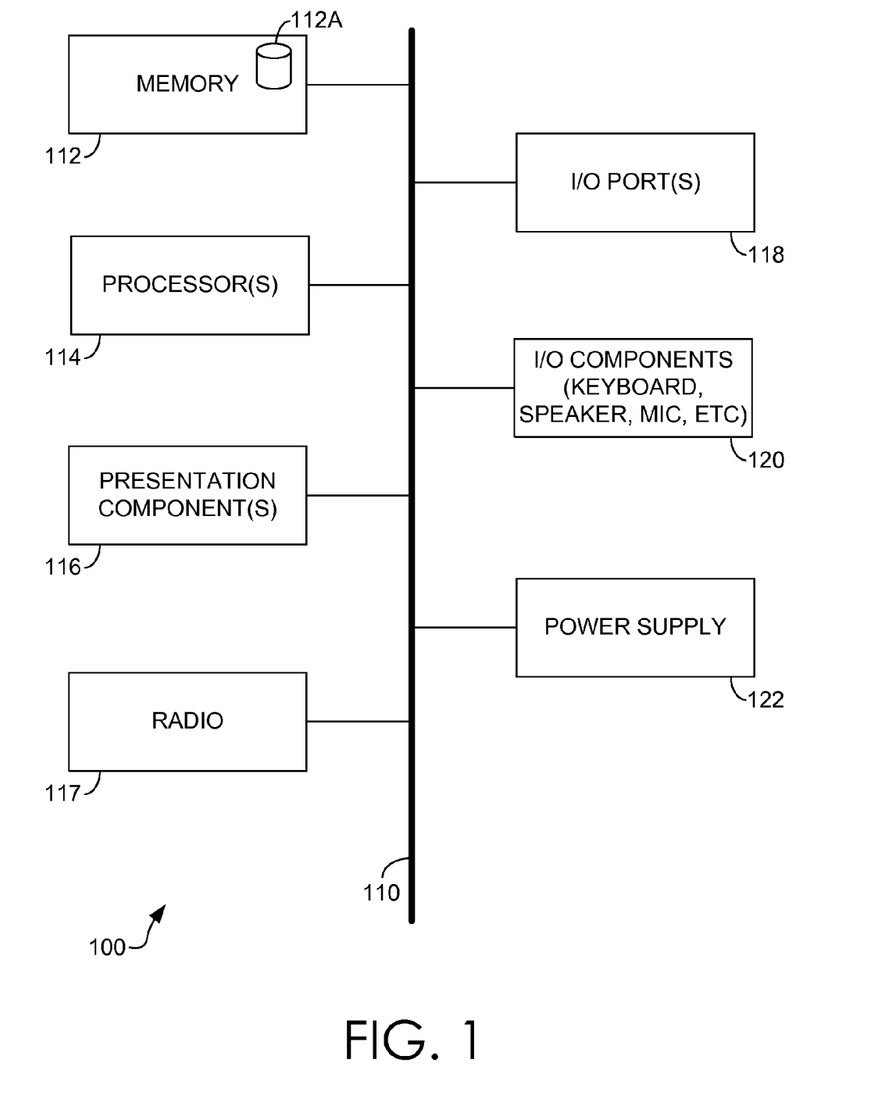
FIG. 1 depicts an exemplary computing device according to embodiments of the present invention.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention provide systems, methods, and computer-readable media for optimizing voice services. Utilizing embodiments hereof, a HARQ algorithm may be implemented at a plurality of layers of a protocol stack of an LTE network. In particular, the HARQ algorithm may be implemented at each layer of the protocol stack.

The HARQ algorithm generally provides a way to provide information to a user when, for example, an error has occurred. The error may be that the user did not receive the correct data or did not receive the data at all, among other things. This, in turn, requires that data be retransmitted to the user. Retransmissions take time and resources that should be allocated to other functions. As LTE networks are based on higher bit rates, it has become increasingly important to reduce accumulated latency in the HARQ and that has pushed the HARQ process to lower layers in the protocol stack (e.g., the physical layer and RLC layer). While implemented at lower layers, HARQ is not currently implemented at each layer of the protocol stack. Thus, this fails to provide a protective mechanism in case of HARQ failure at the lower levels where the HARQ may be located. Additionally, the absence of HARQ at each protocol layer may lead to higher retransmission rates and poor quality of audio services.

The present invention provides HARQ protection at each layer of the protocol stack. The process may be implemented for voice-related services in an LTE network and may be coordinated or managed by the eNodeB of the LTE network. The eNodeB may dynamically manage HARQ implementations automatically based on a variety of factors including, but not limited to, poor radio frequency (RF) signal, a user requesting voice-related services, a retransmission rate, and the like.

Dynamic implementation of HARQ may also be based on detecting a percentage of user devices in a poor coverage area. When a percentage exceeding a predetermined percentage is identified, the eNodeB may dynamically extend HARQ to each layer of the protocol stack for each of the user devices in the poor coverage area. Hence, the present invention may be device specific or group specific.

Figure 2:
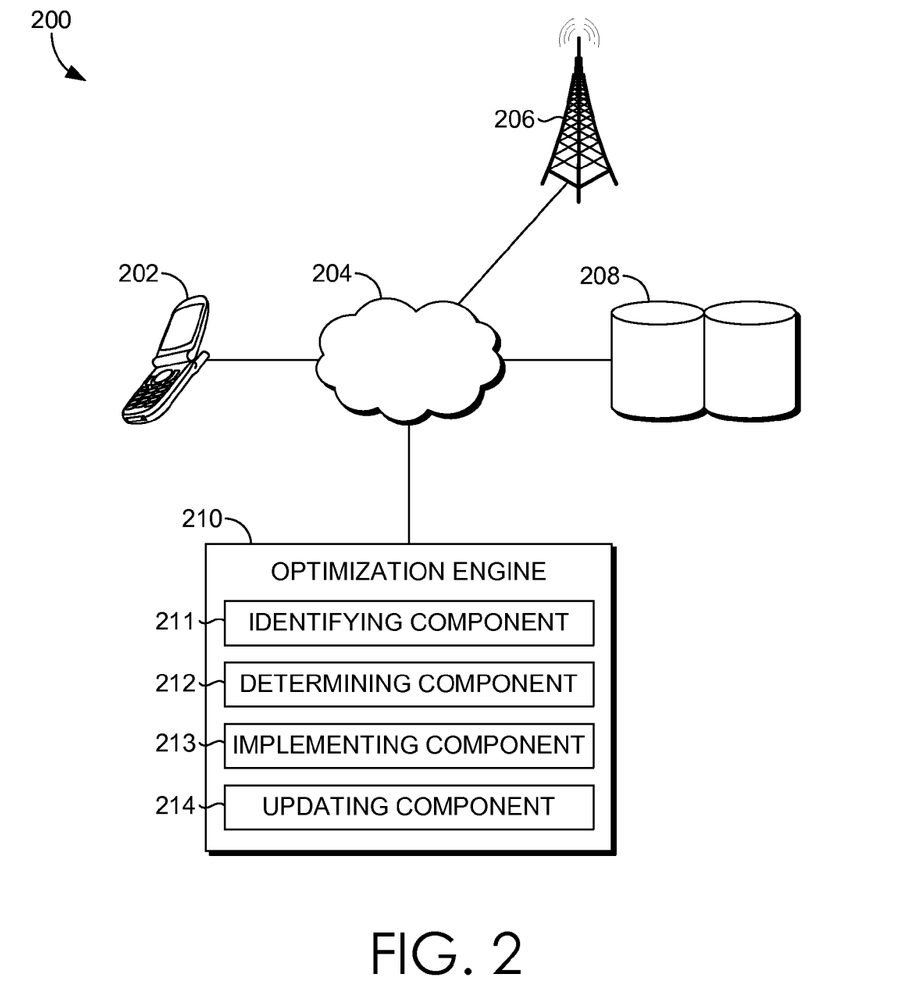
FIG. 2 depicts an illustrative operating system for carrying out embodiments of the present invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment 200 be interpreted as having any dependency or requirement relating to any one or combination of components illustrated.

In the network environment 200, a user device 202 may communicate with other devices, such as mobile devices, servers, etc. The user device 202 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 202 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 202 can utilize network 204 to communicate with other computing devices (e.g., a mobile device(s), a server(s), a personal computer(s), etc.). In embodiments, the network 204 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 204 can include multiple networks, as well as being a network of networks, but is shown in more simple form so as to not obscure other aspects of the present invention. Network 204 can be part of a telecommunications network that connects subscribers to their immediate service provider. In embodiments, the network 204 can be associated with a telecommunications provider that provides services to user devices, such as user device 202. For example, the network 204 may provide voice services to user devices or corresponding users that are registered or subscribed to utilize the services (e.g., the network 204) provided by a telecommunications provider. The network 204 can be any communication network providing voice and/or data service(s), such as, for example, a 1x circuit voice, a 3G network (e.g., CDMA, CDMA2000, WCDMA, GSM, UMTS), or a 4G network (WiMAX, LTE, HSDPA).

In the case of a 4G LTE network, an eNodeB 206 may manage the network 204. Additionally, a database 208 may be coupled to the network for storage of various data including, but not limited to, devices associated with users, customer information, predetermined thresholds associated with the network 204, and the like.

The network environment 200 also includes an optimization engine 210. The optimization engine 210 may be configured to, among other things, manage HARQ implementation to optimize voice services. The optimization engine 210 includes an identifying component 211, a determining component 212, an implementing component 213, and an updating component 214. Additional components of network environment 200 may be present.

The identifying component 211 may be configured to, among other things, identify various characteristics of the network environment 200 such as a location associated with a user device, an RF signal associated with the user device, a retransmission rate of either a device or a group, a signal to noise ratio, and the like.

The determining component 212 may be configured to determine, among other things, whether a user device is requesting voice-related services, whether an RF signal is strong or weak (perhaps based on the signal to noise ratio), whether the retransmission rate exceeds a predetermined threshold, and the like. In an embodiment, the predetermined threshold for a retransmission rate is ten (10) percent. However, the retransmission rate may be any rate desired by a system administrator or other authorized personnel.

Upon determining component 212 determining at least one of the user requesting voice-related services, the RF signal is weak, or the retransmission rate exceeds a predetermined threshold, the eNodeB 206 may automatically implement HARQ at each layer of the protocol stack utilizing, for example, the implementing component 213. The implementing component 213 may implement HARQ at a plurality of layers of the protocol stack based on any one of the user requesting voice-related services, the RF signal associated with one or more user devices being weak/poor, or a retransmission rate exceeding the predetermined threshold, or a combination thereof.

The updating component 214 is configured to, among other things, update the network environment 200 with information related to the user device, the user device location, retransmission rates, RF signals, and the like. The information may be stored in, for example, the database 208. The updating component 214 may be configured to automatically identify the above-listed information on a continuous basis, on a predetermined time interval, or the like. In other words, the system 200 may be configured such that the updating component 214 updates the system 200 whenever there is a change in status to any one of the factors monitored or, alternatively, whenever a predetermined time period has expired. For instance, the system 200 may be configured such that the updating component 214 only performs updates every five minutes.

Once the updating component 214 has updated the system 200, the eNodeB 206, utilizing the optimization engine 210, may alter the HARQ implementation. For example, if the updating component 214 identifies an updated RF signal that went from poor to strong, the implementing component 213 may remove one or more HARQ implementations in the protocol stack. In particular, if HARQ had been implemented at every protocol layer when the RF signal was weak, the implementing component 213 may remove the HARQ implementation from one or more protocol layers such that not every layer of the protocol stack includes the HARQ implementation.

In application, one or more users may have personalized HARQ implementations depending on their specific situation. For example, a user device associated with a poor RF signal and requesting voice-related services in an LTE network may require HARQ at each layer of the protocol stack while another user device associated with the same poor RF signal may be require HARQ at each layer of the protocol stack if they are not requesting voice-related services.

Figure 3:
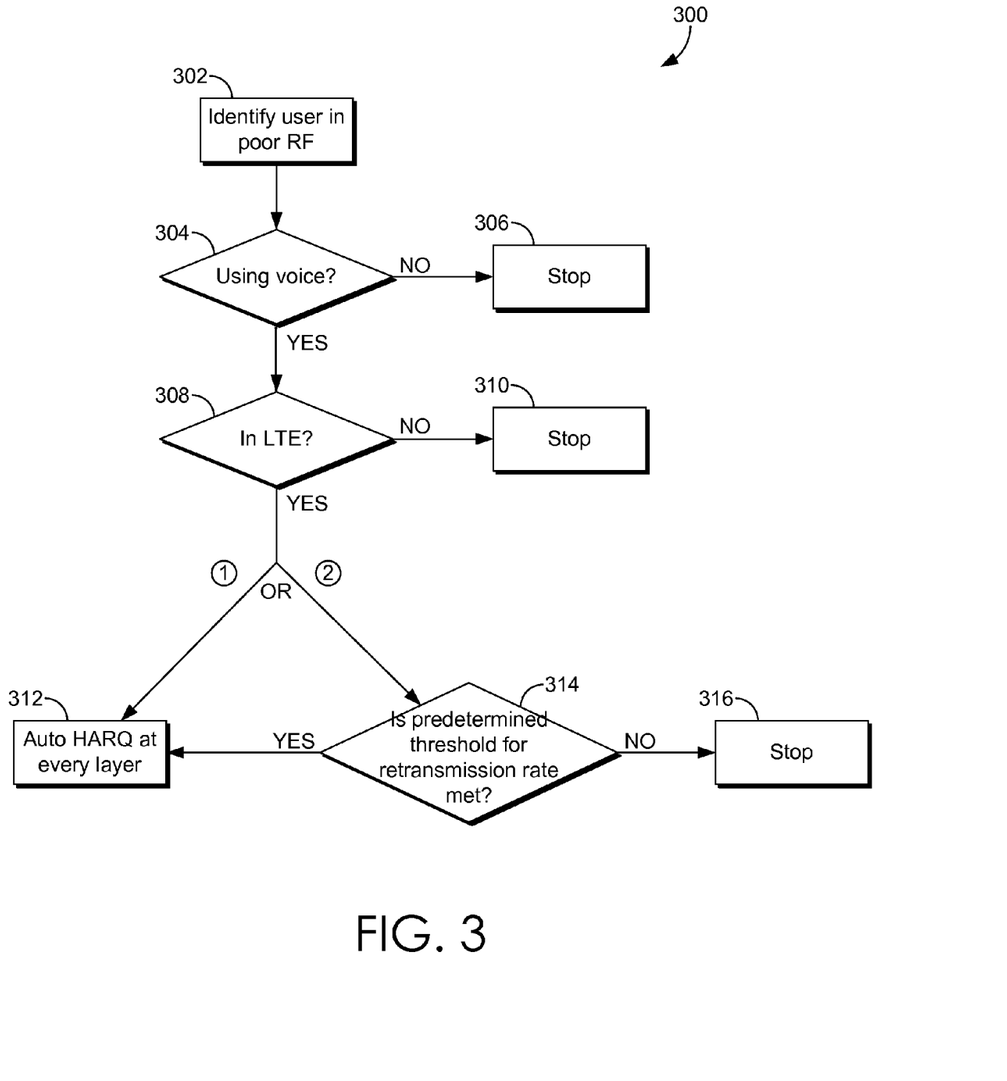
FIG. 3 depicts a flow diagram illustrating a method of optimizing voice services, in accordance with an embodiment of the present invention.

FIG. 3 provides a specific embodiment of a method 300 for optimizing voice services. At block 302, poor RF conditions are identified for a user/user device. Poor RF conditions may be identified utilizing a signal to noise ratio. A low signal to noise ratio indicates a poor RF signal. One of ordinary skill in the art would be able to differentiate a low signal to noise ratio from a high signal to noise ratio in order to determine the strength of an RF signal. At block 304, a determination is made whether the user device is using and/or requesting to use voice-related services. If the user device is not using or requesting to use voice-related services, the method stops at block 306. If the user device is using or requesting to use voice-related services, a determination is made at block 308 whether the user device is located within an LTE network. If the user device is not located within an LTE network, the method stops at block 310. If the user device is located in an LTE network, two options may occur. The first is that HARQ may be automatically implemented at every layer of the protocol stack, as indicated at block 312. Alternatively, the second option is to determine, at block 314, whether a predetermined threshold related to a retransmission rate is met. If the predetermined threshold has not been met, the method stops at block 316. If the predetermined threshold has been met, HARQ is automatically implemented at every layer of the protocol stack at block 312.

Figure 4:
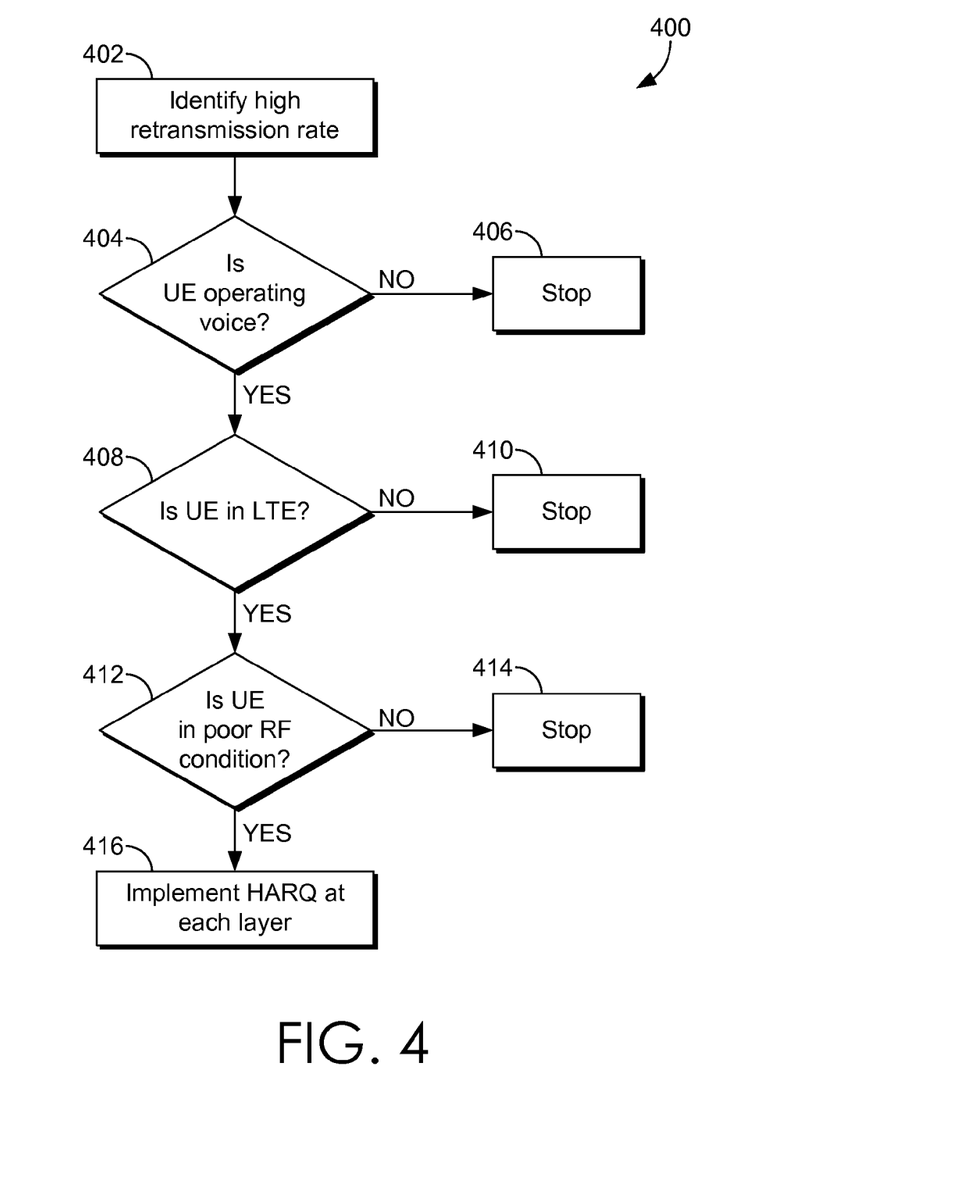
FIG. 4 depicts a flow diagram illustrating a method of optimizing voice services, in accordance with an embodiment of the present invention.

FIG. 4 provides a specific embodiment of a method 400 for optimizing voice services. At block 402, a high retransmission rate is identified. A high retransmission rate, as used herein, refers generally to a retransmission rate that exceeds a predetermined threshold. The predetermined threshold may be, for instance, a retransmission rate greater than ten percent. At block 404, it is determined whether the user device/equipment (UE) is operating voice services. If not, the method stops at block 406. If the UE is operating voice services, the method proceeds to block 408 where it is determined whether the UE is in an LTE network. If not, the method stops at block 410. If the UE is in an LTE network, a determination is made whether the UE is in poor RF conditions at block 412. If not, the method stops at block 414. If the UE is determined to be associated with poor RF conditions, HARQ is implemented at each layer of a protocol stack at block 416.

Figure 5:
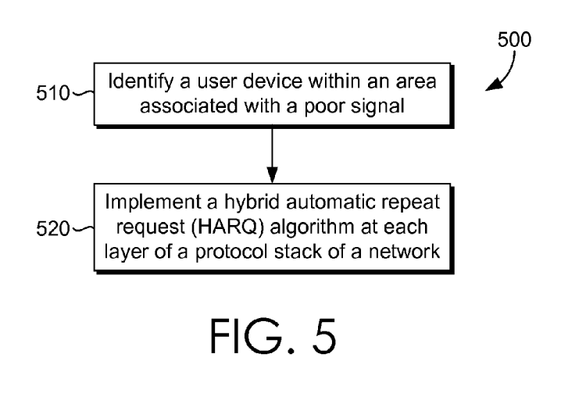
FIG. 5 provides a first exemplary method for optimizing voice services, in accordance with an embodiment of the present invention.

Turning now to FIG. 5, a flow diagram is shown illustrating a first exemplary method 500 for optimizing voice services in accordance with an embodiment of the present invention. In embodiments, method 500 can be performed using an optimization engine such as the optimization engine 210 illustrated in FIG. 2. At block 510, a user device is identified as being within an area associated with a poor RF signal. As previously described, a poor RF signal may be identified by analyzing a signal to noise ratio such that a low signal to noise ration indicates a poor RF signal. A signal to noise ratio equal to or greater than 1:1 is typically said to have more signal than noise. At block 520, HARQ is implemented at each layer of a protocol stack of a network.

Figure 6:
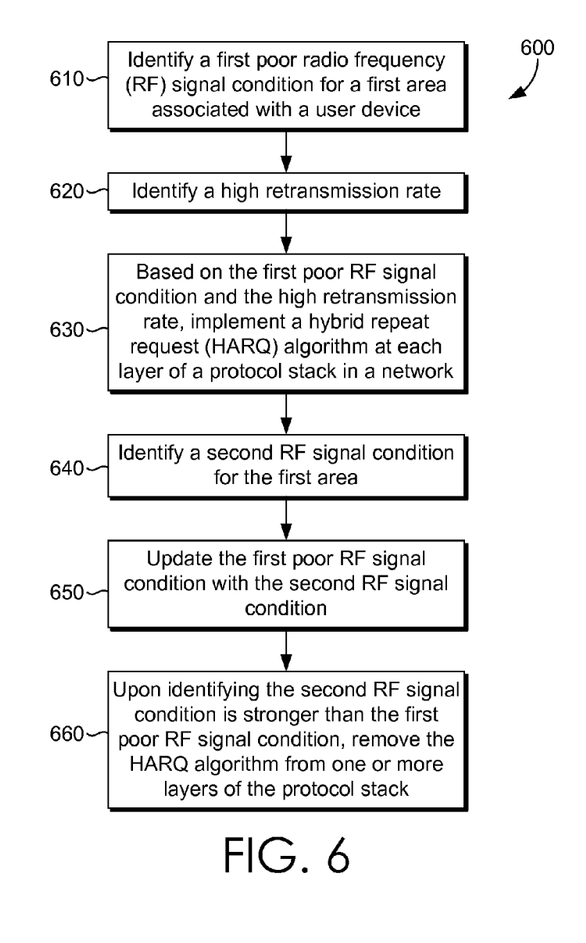
FIG. 6 provides a second exemplary method for optimizing voice services, in accordance with an embodiment of the present invention.

Turning now to FIG. 6, a flow diagram is shown illustrating a second exemplary method 600 for optimizing voice services, in accordance with an embodiment of the present invention. In embodiments, method 600 can be performed using an optimization engine such as the optimization engine 210 illustrated in FIG. 2.

At block 610, a first poor RF signal is identified for a first area associated with a user device. At block 620, a high retransmission rate is identified. A high retransmission rate, in this case, is a retransmission rate exceeding ten percent retransmissions. At block 630, HARQ is implemented at each layer of a protocol stack based on the poor RF signal and the high retransmission rate. At block 640, a second RF signal is identified for the first area. At block 650, the first poor RF signal is updated with the second RF signal, where the second RF signal is stronger than the first poor RF signal. At block 660, HARQ is removed from at least one layer of the protocol stack upon identifying the second RF signal is stronger than the first poor RF signal.

It will be understood by those of ordinary skill in the art that the order of steps shown in the methods 300 of FIG. 3, 400 of FIG. 4, 500 of FIGS. 5 and 600 of FIG. 6 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more computer-readable storage media having computer-executable instructions embodied thereon that, when executed, perform a method for optimizing voice services, the method comprising:
   identifying a user device within an area associated with a poor signal, wherein a poor signal is indicated by identifying a low signal to noise ratio; and
   implementing a hybrid automatic repeat request (HARQ) algorithm at each layer of a protocol stack of a network.

2. The media of claim 1, wherein the network is a long term evolution (LTE) network.

3. The media of claim 2, further comprising determining whether the user device is operating a voice functionality in the LTE network.

4. The media of claim 1, further comprising identifying a retransmission rate associated with the user device.

5. The media of claim 4, further comprising determining whether a predetermined threshold of the retransmission rate has been satisfied, wherein the predetermined threshold is when the retransmission rate exceeds ten percent.

6. The media of claim 1, wherein the protocol stack comprises a physical layer, a MAC layer, a RLC layer, a PDCP layer, and a RRC layer.

7. The media of claim 1, wherein the HARQ algorithm is implemented automatically by the e-Node B of the network.

8. The media of claim 1, further comprising:
   identifying a plurality of user devices within the area associated with the poor signal, and
   automatically implementing HARQ at each layer of the protocol stack for each of the plurality of user devices.

9. One or more computer-readable storage media having computer-executable instructions embodied thereon that, when executed, perform a method for optimizing voice services, the method comprising:
   identifying a first poor radio frequency (RF) signal condition for a first area associated with a user device, wherein a poor radio frequency signal condition is indicated by identifying a low signal to noise ratio;
   identifying a high retransmission rate, wherein a high retransmission rate is a retransmission rate exceeding ten percent;
   based on the first poor RF signal condition and the high retransmission rate, implementing a hybrid repeat request (HARQ) algorithm at each layer of a protocol stack in a network;
   identifying a second RF signal condition for the first area,
   updating the first poor RF signal condition with the second RF signal condition, wherein the second RF signal condition is a stronger RF signal than the first poor RF signal condition; and
   upon identifying the second RF signal condition is stronger than the first poor RF signal condition, removing the HARQ algorithm from one or more layers of the protocol stack.

10. The media of claim 9, wherein the network is a long term evolution (LTE) network.

11. The media of claim 10, further comprising determining whether the user device is operating a voice functionality in the LTE network.

12. A system for optimizing voice services, the system comprising:

a computing device associated with one or more processors and one or more computer storage media; and an optimization engine comprising:

an identifying component configured to identifying at least one of a type of network, a retransmission rate of a user device and a radio frequency (RF) signal of an area associated with the user device;

a determining component configured to determine at least one of whether the user device is operating a voice functionality and whether the retransmission rate exceeds a predetermined threshold; and an implementing component configured to implement a hybrid repeat request (HARQ) algorithm at each level of a protocol stack.

13. The system of claim 12, wherein the predetermined threshold of the retransmission rate is ten percent.

14. The system of claim 12, wherein the network is a long term evolution (LTE) network.

15. The system of claim 12, wherein the RF signal is identified as a poor RF signal or a strong RF signal based on a signal to noise ratio.

16. The system of claim 12, further comprising an updating component configured to dynamically update the RF signal of the area associated with the user device.

17. The system of claim 16, wherein the updating component is further configured to remove the HARQ algorithm from at least one layer of the protocol stack upon updating the RF signal.

18. The system of claim 12, wherein the HARQ algorithm is automatically implemented at layers of the protocol stack based on at least one of RF signals and retransmission rates.

19. The system of claim 12, wherein the HARQ algorithm is automatically removed from layers of the protocol stack based on an updated RF signal.

20. The system of claim 12, wherein the system dynamically alters the HARQ algorithm on a user-specific basis or a group basis.

* * * * *